US 7,460,475 B2

(12) United States Patent
Tourunen et al.

(10) Patent No.: US 7,460,475 B2
(45) Date of Patent: Dec. 2, 2008

(54) ALLOCATING DATA TRANSMISSION RESOURCES IN PACKET-SWITCHED DATA TRANSMISSION

(75) Inventors: Ari Tourunen, Espoo (FI); Juha Kalliokulju, Vesilahti (FI); Hans Kallio, Tampere (FI); Pekka Marjelund, Muijala (FI); Pekka Kohonen, Espoo (FI)

(73) Assignee: Nokia Corporation, Espoo (FI)

( * ) Notice: Subject to any disclaimer, the term of this patent is extended or adjusted under 35 U.S.C. 154(b) by 888 days.

(21) Appl. No.: 09/888,884

(22) Filed: Jun. 25, 2001

(65) Prior Publication Data

US 2002/0001298 A1 Jan. 3, 2002

(30) Foreign Application Priority Data

Jun. 28, 2000 (FI) .................... 20001536

(51) Int. Cl.
*H04J 1/16* (2006.01)
*H04J 3/14* (2006.01)
(52) U.S. Cl. .................... 370/230.1; 370/328; 370/465; 455/426.1; 709/247
(58) Field of Classification Search .............. 370/230.1, 370/328–338, 352–353, 431, 469, 465, 395.52, 370/395.21; 455/426.1; 709/247
See application file for complete search history.

(56) References Cited

U.S. PATENT DOCUMENTS 6,438,137 B1 * 8/2002 Turner et al. ................. 370/466

6,522,883 B2 * 2/2003 Titmuss et al. .............. 455/445

(Continued)

FOREIGN PATENT DOCUMENTS

EP 00823797 A2 11/1998

(Continued)

OTHER PUBLICATIONS

Japanese Unexamined Patent Publication (Kokai) No. 7-183865, with English Abstract.

(Continued)

*Primary Examiner*—Dwayne D Bost
*Assistant Examiner*—Inder P Mehra
(74) *Attorney, Agent, or Firm*—Perman & Green, LLP

(57) ABSTRACT

A method of allocating data transmission resources in a packet-switched telecommunications system which comprises a terminal and a fixed network to which an operational entity is defined for defining resources for a radio bearer. Radio bearer resources are defined for the terminal on the basis of an application used on the radio bearer, and the used compression method of header fields in data packets is selected before the radio bearer resources are defined, the resources being defined in such a manner that they also comprise the capacity required by the selected compression method of header fields in data packets. The compression methods of header fields in data packets, which are supported by the terminal, are transmitted to the operational entity in the fixed network for defining the compression method to be used. Capacity is defined for the radio bearer in two directions, if the selected compression method of header fields in data packets requires a bi-directional connection.

16 Claims, 3 Drawing Sheets

U.S. PATENT DOCUMENTS

| | | | |
|---|---|---|---|
| 6,577,631 B1 * | 6/2003 | Keenan et al. | 370/394 |
| 6,608,832 B2 * | 8/2003 | Forslow | 370/353 |
| 6,937,566 B1 * | 8/2005 | Forslow | 370/231 |
| 6,963,570 B1 * | 11/2005 | Agarwal | 370/395.32 |
| 2004/0095939 A1 * | 5/2004 | Yang | 370/395.52 |

FOREIGN PATENT DOCUMENTS

| | | |
|---|---|---|
| EP | 00993137 A1 | 12/2000 |
| EP | 1122925 A1 | 8/2001 |
| WO | 99/022557 A2 | 5/1999 |
| WO | WO 99/66736 | 12/1999 |

OTHER PUBLICATIONS

Japanese Unexamined Patent Publication (Kokai) No. 2000-115861, with English Abstract.

Japanese Unexamined Patent Publication (Kokai) No. 10-94059, with English Abstract.

Japanese Office Action, dated Nov. 1, 2005.

* cited by examiner

ALLOCATING DATA TRANSMISSION RESOURCES IN PACKET-SWITCHED DATA TRANSMISSION

BACKGROUND OF THE INVENTION

The invention relates to allocating data transmission resources in packet-switched data transmission and especially to optimizing radio interface resources in wireless packet-switched data transmission.

Third-generation mobile systems, called UMTS (Universal Mobile Telecommunication System) and IMT-2000 (International Mobile Telephone System), will provide not only circuit-switched speech services, but also packet-switched services for instance in the manner of the packet radio network GPRS (General Packet Radio Service) designed for the GSM system. Packet-switched data transmission enables the use of different data services by means of a mobile station and, on the other hand, the allocation of the resources of a mobile system, especially the radio interface, for each user as necessary.

When the user of a terminal in a UMTS system wants to use a packet-switched application, for instance to download a video file from the network to the terminal, the radio resource management system RRM of the UMTS system allocates to a radio bearer an application-based capacity reservation which not only depends on the used application but also on the available radio bearer parameters. In typical one-way data transmission, for instance when downloading a file from the network, a data rate of x bit/s can then be allocated to a terminal in the downlink direction (from the base station to the terminal) and a data rate of 0 bit/s in the uplink direction (from the terminal to the base station). In such an application, the uplink data transmission is typically not needed and consequently, there is no need to allocate resources to it.

One of the parameters defining the radio bearer is the method used by the terminal for compressing the header fields of data packets. Header compression of data packets being transmitted and decompression of data packets being received is performed on the packet data convergence protocol layer PDCP of the UMTS system. The PDCP layer of a terminal typically supports several header compression methods so as to enable connection set-up with as many network layer protocol types as possible. Some header compression methods may also need a reverse connection for making different acknowledgments and solving error situations. A certain bandwidth then needs also to be reserved for the reverse connection, but, on the other hand, the compression of the header field decreases the need for a bandwidth for a forward connection.

A problem with the above arrangement arises from using an application-based capacity allocation together with a header compression method which requires a bi-directional connection. If the terminal only has header compression methods requiring a bi-directional connection available to it and the terminal sends a capacity allocation request to an application which is typically uni-directional, such as the downloading of a file from the network described above, the radio resources management system RRM only allocates a one-way connection for the radio bearer on the basis of the application. The available compression methods do not then function and the connection cannot be set up without being able to reserve an adequate bandwidth also for the reverse connection using special arrangements comprising new capacity allocation requests. This is not possible in all situations and, in any case, such an arrangement complicates an optimal allocation of radio resources.

BRIEF DESCRIPTION OF THE INVENTION

It is thus an object of the invention to develop an improved method and an apparatus implementing the method so as to reduce the drawbacks mentioned above. The object of the invention is achieved by a method and a system which are characterized in what is stated in the independent claims. Preferred embodiments of the invention are set forth in the dependent claims.

The invention is based on selecting the compression method to be used on the radio link already before setting up a radio bearer, and this information is transmitted to the radio resource management system RRM which takes into consideration in the capacity allocation a possibly selected bi-directional compression algorithm and allocates the necessary capacity for both the downlink and the uplink direction.

The method and system of the invention provide the advantage that header compression methods requiring a bi-directional connection also function immediately on radio bearers which on account of to the application would only need a one-way radio bearer. A further advantage is that no extra signaling is needed to set up the reverse connection, because the bi-directional nature is already taken into consideration when the radio bearer is set up. Yet another advantage is that the total bandwidth being allocated to the radio bearer can be optimized when taking into consideration both the bandwidth required by the compression method and the benefit derived from the use of the compression algorithm as a smaller amount of data.

BRIEF DESCRIPTION OF THE FIGURES

In the following, the invention will be described by means of preferred embodiments, with reference to the attached drawings in which.

DETAILED DESCRIPTION OF THE INVENTION

In the following, the invention will be described using a packet radio service according to the UMTS system as an example. The invention is, however, not restricted to the UMTS system only, but can be applied to any packet-switched data transmission method whose capacity allocation of packet data connections requires that the used header compression methods are taken into consideration.

Figure 1:
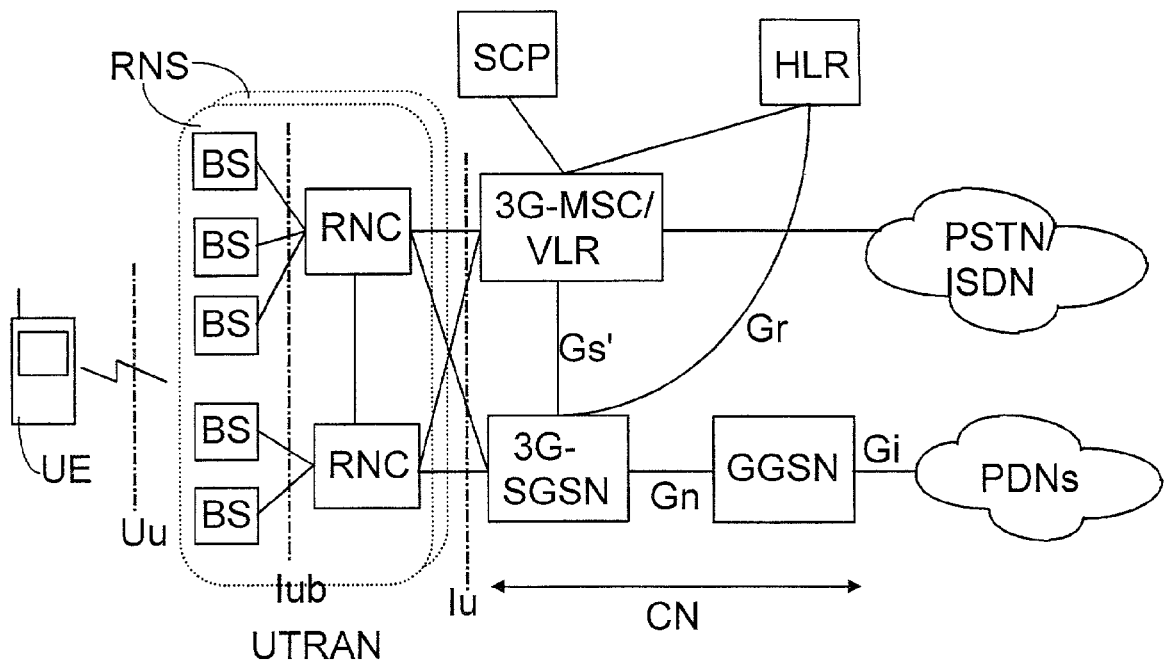
FIG. 1 shows a block diagram of the structure of the UMTS system.

The structure of the UMTS mobile telephone system is described in FIG. 1. FIG. 1 only contains the blocks essential for explaining the invention, but it is obvious to a person skilled in the art that a conventional mobile telephone system also comprises other functions and structures, which need not be described in greater detail herein. The main parts of a mobile telephone system are a core network CN, a UMTS mobile telephone system terrestrial radio access network UTRAN, and a mobile station or user equipment UE. The interface between the CN and UTRAN is referred to as Iu and the air interface between UTRAN and the UE is referred to as Uu.

UTRAN typically comprises several radio network subsystems RNS, the interface between the RNSs being referred to as Iur (not shown). An RNS comprises a radio network controller RNC and one or more base stations BS, also referred to as nodes B. The interface between the RNC and B is referred to as Iub. The base station BS typically takes care of radio path implementation and the radio network controller RNC manages at least the following: management of radio resources, control of handover between cells, power adjustment, timing and synchronization, paging the subscriber terminal.

The core network CN is made up of an infrastructure belonging to a mobile telephone system and external to UTRAN. In the core network, a mobile switching center/visitor location register 3G-MSCNLR is connected to a home location register HLR and preferably also to a service control point SCP of an intelligent network. The home location register HLR and the visitor location register VLR comprise information on mobile subscribers: the home location register HLR comprises information on all subscribers in a mobile network and the services they subscribe to, and the visitor location register VLR comprises information on mobile stations visiting the area of a certain mobile switching center MSC. A connection to a serving node of a packet radio system 3G-SGSN (Serving GPRS Support Node) is formed through an interface Gs' and to a fixed telephone network PSTN/ISDN through a gateway mobile switching center GMSC (not shown). A connection from the serving node 3G-SGSN to external data networks PDN is formed through an interface Gn to a gateway node GGSN (Gateway GPRS Support Node) which has a further connection to the external data networks PDN. The connection from both the mobile switching center 3G-MSC/LR and the serving node 3G-SGSN to the radio network UTRAN (UMTS Terrestrial Radio Access Network) is set up through the interface Iu. It should be noted that the UMTS system is designed in such a manner that the core network CN can be identical to the core network of a GSM system, for instance, in which case there is no need to rebuild the entire network infrastructure.

The UMTS system also comprises a packet radio system which is to a large extent implemented according to a GPRS system connected to a GSM network, which explains the references to a GPRS system in the names of the network elements. The UMTS packet radio system can comprise several gateway and serving nodes, and several serving nodes 3G-SGSN are typically connected to one gateway node 3G-GGSN. Both nodes 3G-SGSN and 3G-GGSN function as routers supporting the mobility of a mobile station, which routers control the mobile system and route data packets to mobile stations regardless of their location and the used protocol. The serving node 3G-SGSN is in contact with a mobile station MS through the radio network UTRAN. A task of the serving node 3G-SGSN is to detect mobile stations capable of packet radio connections in its service area, to transmit and receive data packets from said mobile stations and to track the location of the mobile stations in its service area. Further, the serving node 3G-SGSN is in contact with the mobile switching center 3G-MSC and the visitor location register VLR through the signaling interface Gs' and with the home location register HLR through the interface Gr. Records related to packet radio services and comprising subscriber-specific packet data protocol contents are also stored in the home location register HLR.

The gateway node 3G-GGSN acts as a gateway between the UMTS network packet radio system and the external data network PDN (Packet Data Network). External data networks include the UMTS or GPRS network of a second network operator, the Internet, an X.25 network or a private local area network. The gateway node 3G-GGSN is in contact with said data networks through the interface Gi. Data packets being transmitted between the gateway node 3G-GGSN and the serving node 3G-SGSN are always encapsulated according to the gateway tunneling protocol GTP. The gateway node 3G-GGSN also contains PDP (Packet Data Protocol) addresses of the mobile stations and routing information, i.e. 3G-SGSN addresses. The routing information is thus used to link the data packets between the external data network and the serving node 3G-SGSN. The network between the gateway node 3G-GGSN and the serving node 3G-SGSN employs an IP protocol, preferably the IPv6 (Internet Protocol, version 6).

Figure 2A:
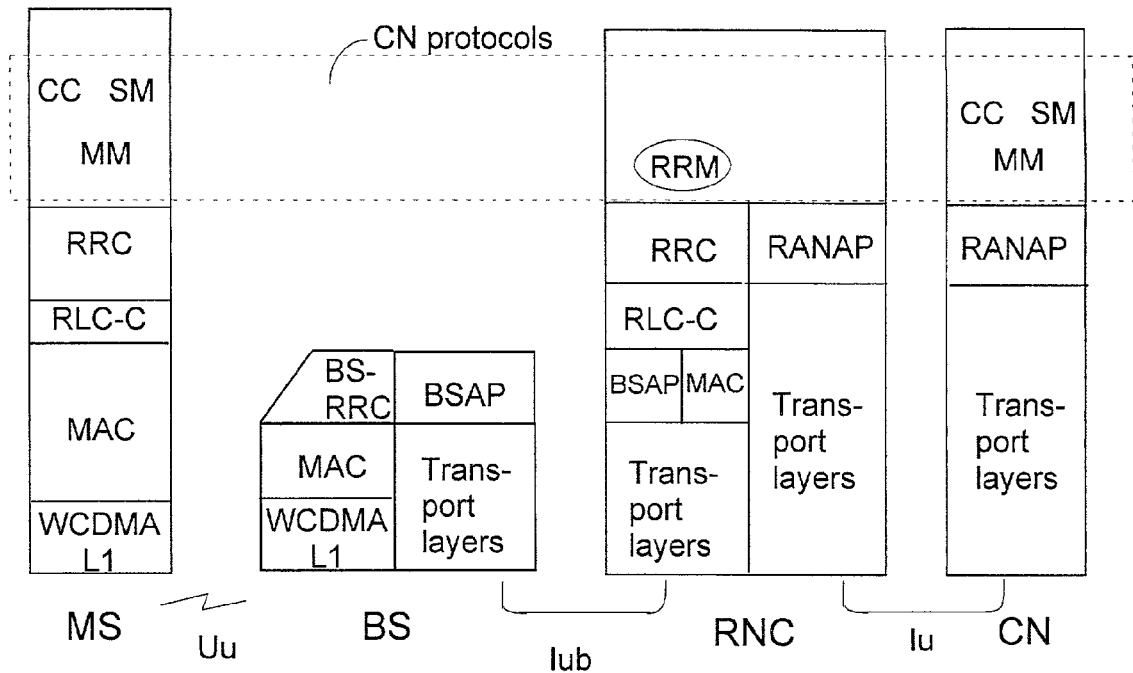
FIGS. 2a and 2b show protocol stacks used for UMTS control signaling and user data transmission.
Figure 2B:
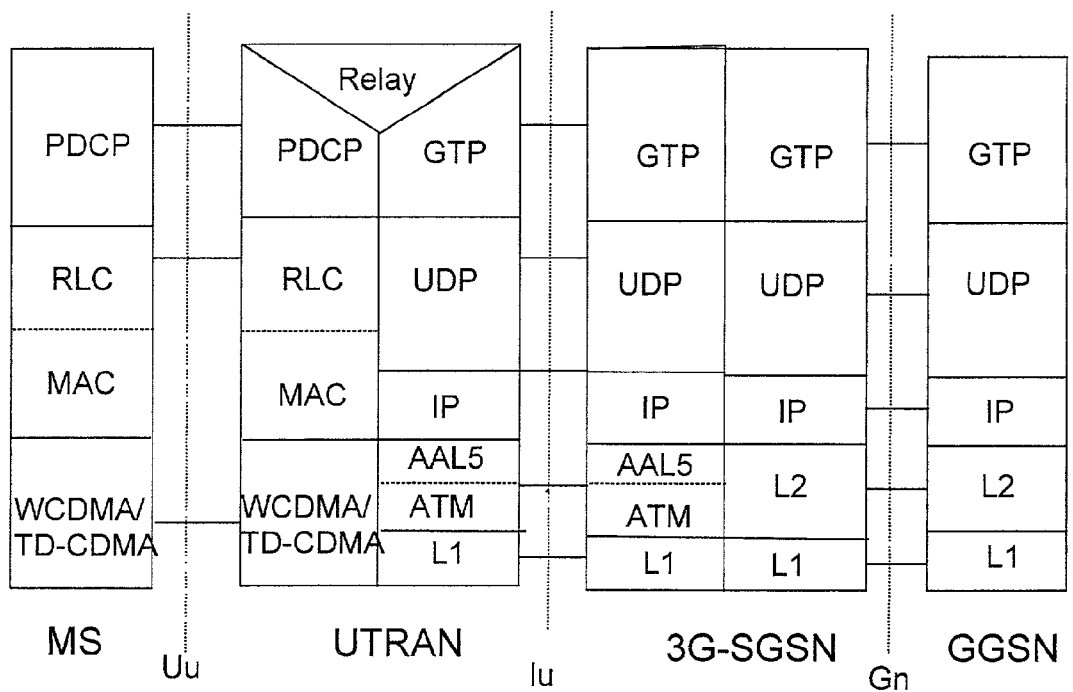

FIGS. 2a and 2b show UMTS protocol stacks used for control signaling (control plane) and user data transmission (user plane) in a packet radio service of the UMTS system. FIG. 2a shows the protocol stack used for control signaling between a mobile station MS and the core network CN. Mobility management MM of the mobile station MS, call control CC and session management SM are signaled on the highest protocol layers between the mobile station MS and the core network CN in such a manner that the base stations BS and the radio network controller RNC located in between are transparent to this signaling. Radio resource management of radio links between mobile stations MS and base stations BS is managed by a radio resource management system RRM which transmits control data from a radio network controller RNC to base stations BS. These functions related to the general management of a mobile system form a group called core network protocols (CN protocols), also known as Non-Access Stratum. Correspondingly, the signaling related to radio network control between a mobile station MS, a base station BS and a radio network controller RNC is done on protocol layers called radio access network protocols (RAN protocols), i.e. Access Stratum. These include transfer protocols on the lowest level, whose control signaling is transferred to the higher levels for further processing. The most essential of the higher Access Stratum layers is the radio resource control protocol RRC which is responsible for establishing, configuring, maintaining and releasing radio links between the mobile station MS and the radio network UTRAN and for transmitting control information from the core network CN and the radio network RAN to the mobile stations MS. In addition, the radio resource control protocol RRC is responsible for allocating enough capacity for the radio bearer according to the instructions of the radio resource management system RRM in application-based capacity allocation, for instance.

A protocol stack as shown in FIG. 2b is used in transmitting UMTS packet-switched user data. On the interface Uu between the radio network UTRAN and a mobile station MS, the lower-level data transmission on a physical layer is performed according to a WCDMA or TDCDMA protocol. A MAC layer above the physical layer transmits data packets between the physical layer and an RLC layer and the RLC layer handles the logical management of the radio links of different radio bearers. The RLC functions comprise for instance segmenting the user data (RLC-SDU) being transmitted into one or more RLC data packets RLC-PDU. Data packets (PDCP-PDU) of a PDCP layer above the RLC, including the header fields of upper layers, can optionally be compressed. After this, the PDCP-PDUs are forwarded to the RLC and they correspond to one RLC-SDU. The user data and the RLC-SDUs are segmented and transmitted in RLC frames, to which address and verification information essential for data transmission is added. The RLC layer also takes care of retransmission of damaged frames. The serving node 3G-SGSN manages the routing of the data packets coming from the mobile station MS through the radio network RAN on to the correct gateway node 3G-GGSN. This connection uses the tunneling protocol GTP which encapsulates and tunnels all user data and signaling transmitted through the core network. The GTP protocol runs on top of the IP used by the core network.

One of the tasks of the PDCP layer is to enable a transparent transmission of data packets coming from the higher application-level layers on to the lower link-level layers and vice versa between UMTS terminals and elements of the radio network UTRAN. Thus, it must be possible to modify the PDCP layer in such a manner that it can also transmit data packets of other network-level protocols than the IP protocols (IPv4, IPv6) already supported.

Another important task of the PDCP layer comprises functions related to improving channel efficiency. These functions are typically based on different optimization methods, such as compression algorithms of data packet header fields. Since today the network-level protocols planned for the UMTS are IP protocols, the compression algorithms used are those standardized by the IETF (Internet Engineering Task Force). It is, however, possible to apply to the PDCP layer any header compression algorithm which is selected according to the network-level protocol used in each case. Some header compression algorithms may require a bi-directional connection between the terminal and the network so that it is possible to take care of various acknowledgments and manage recovery from errors.

The tasks of the PDCP layer also include transmitting data packets PDCP-SDU and the related PDCP sequence numbers to a new radio network sub-system in internal handovers between UMTS radio network subsystems (SRNS Relocation). Another task is to multiplex several radio bearers to one and the same RLC entity, when necessary.

Figure 3:
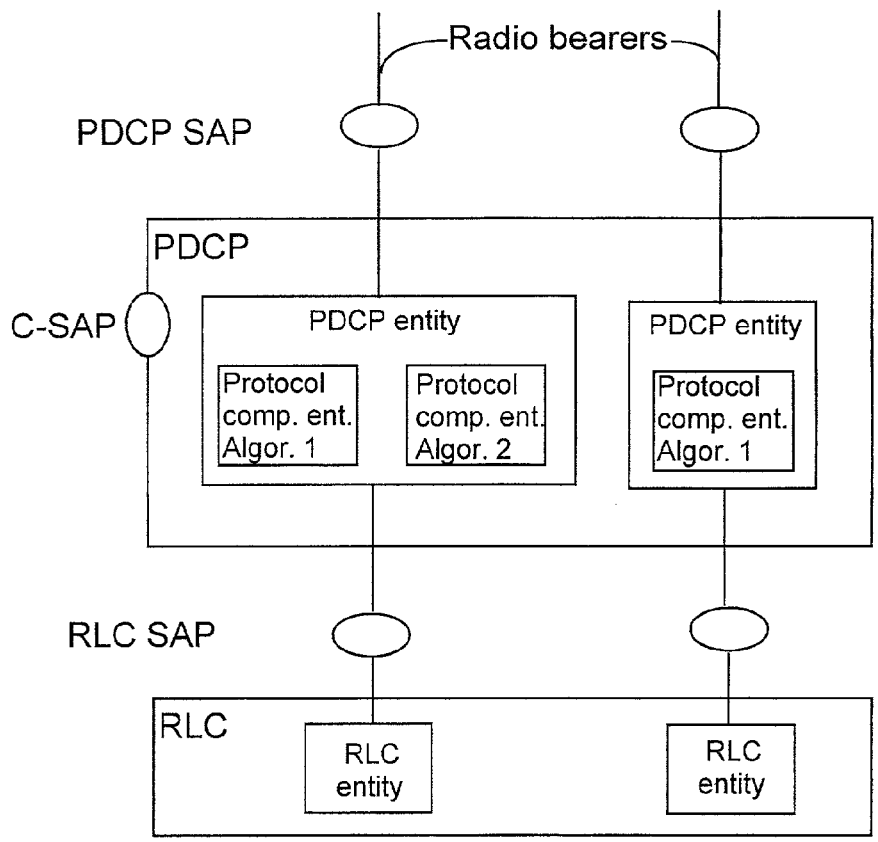
FIG. 3 shows a block diagram of an functional model of a PDCP layer.

FIG. 3 shows an functional model of the PDCP layer, in which one PDCP entity is defined for each radio bearer. Since in the present systems, an individual PDP context is defined for each radio bearer, one PDCP entity is also defined for each PDP context, and a certain RLC entity is defined for each PDCP entity on the RLC layer. As stated above, the PDCP layer can in principle be operationally implemented in such a manner that several PDP contexts are multiplexed on the PDCP layer, in which case on the RLC layer below the PDCP layer, one RLC entity receives data packets from several radio bearers at the same time.

Each PDCP entity can use one or more header compression algorithms or not use any. Several PDCP entities can also use the same algorithm. The radio resource controller RRC negotiates a suitable algorithm for each PDCP entity as well as parameters controlling the algorithm and then advises the selected algorithm and parameters to the PDCP layer through a PDCP-C-SAP point (PDCP Control Service Access Point). The used compression method depends on the network-level protocol type used on the connection, the type being indicated to the radio resource controller when the PDP context is activated.

Indicating and distinguishing various compression methods on the PDCP layer is done by means of packet identifiers PID attached to the data packets PDU. For the packet identifier PID values of each PDCP entity a table is created, in which different compression algorithms are matched to different data packets and the value of the packet identifier PID is determined as a combination of these. If no compression algorithm is used, the packet identifier PID obtains the value zero. For each compression algorithm and its combinations with different data packet types, PID values are determined sequentially in such a manner that the PID values of each compression algorithm start from n+1, wherein n is the last PID value defined for the previous compression algorithm. The order of the compression algorithms is determined in negotiations with the radio resource controller RRC. The PDCP entities at each end of the packet data connection can identify the compression algorithms of transmitted and received data packets on the basis of the PID value table. This information is, however, not stored in the radio resource controller RRC.

In application-based capacity allocation, in which for instance, an application of a mobile station MS transmits a request to the network to establish a radio bearer, a capacity request is transmitted from the mobile station MS as control signaling to the function SM (Session Management) managing core network connections, from which the capacity request is forwarded to the corresponding function SM of the serving node 3G-SGSN. The serving node 3G-SGSN negotiates with the radio resource management system RRM of the radio network controller RNC on whether radio resources according to the capacity request are available. If there are enough resources, the serving node 3G-SGSN gives the resource allocation task to the radio resource management system RRM whose tasks include the allocation of the limited radio resources as optimally as possible to the different radio bearers. The radio resource management system RRM determines what kind of radio resource parameters would be optimal for using the application and defines according to the available radio resource capacity the most suitable parameters for the radio bearer. The radio resource management system RRM transmits instructions to the radio resource control protocol RRC which performs the actual radio resource allocation. For applications which require a one-way connection only, all the available capacity, for instance x kbit/s, is typically allocated for the one direction, typically the downlink direction, and no capacity, i.e. 0 kbit/s, is allocated for the other direction, i.e. the uplink direction. If the terminal then tries or is forced to use a header compression algorithm requiring a bi-directional connection, data transmission between the network and the terminal will not succeed.

Now by means of the present invention, this can be avoided in such a manner that the compression method used for the radio link is selected already before establishing the radio bearer and the information is transmitted to the radio resource management system RRM which takes into account the possibly selected bi-directional compression algorithm in capacity allocation. In this case, the total bandwidth allocated for the radio bearer can be optimized by taking into account both the bandwidth required by the compression method and the benefit derived from the use of the compression algorithm as a smaller amount of data.

Figure 4:
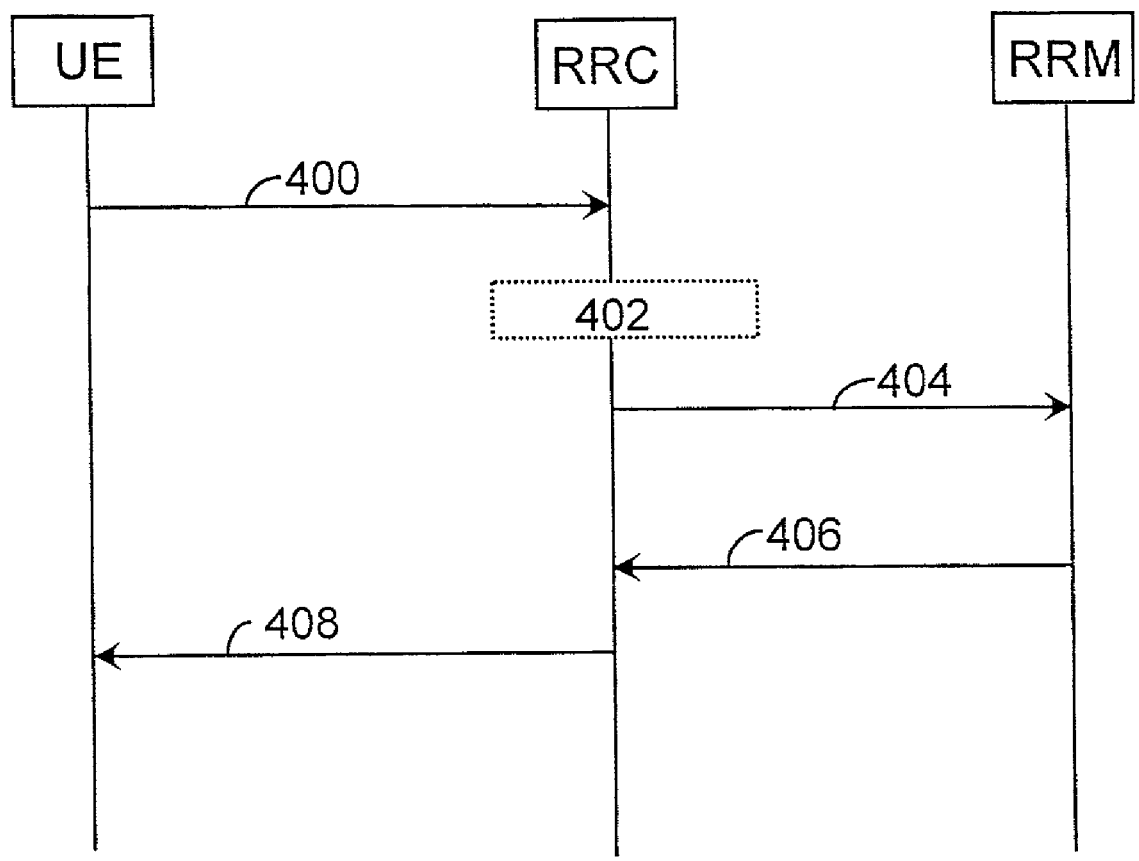
FIG. 4 shows capacity allocation signaling of an embodiment of the invention.

This can be illustrated by means of FIG. 4 which shows the signaling of an embodiment for allocating capacity for a bi-directional connection. The PDCP layer of the user equipment UE supports at least one compression algorithm which requires a bi-directional connection. Information on the compression algorithms (400) supported by the user equipment UE is transmitted, for instance in a UE_capability message known per se, to the radio resource control layer RRC of the radio network controller RNC when the radio bearer is established. The radio network controller RNC decides (402) the compression algorithm to be used on the radio bearer and advises this to the radio resource management system RRM (404). In response to an application-based capacity allocation request, the serving node 3G-SGSN and the radio resource management system RRM of the radio network controller RNC negotiate as described above whether there are enough radio resources. If enough resources are available, the RRM allocates capacity to the radio bearer in such a manner that an as optimal bandwidth as possible is defined based on the application, also taking into account, however, possible limitations set by the compression algorithm. On the basis of these conditions, the RRM decides how the radio resource controller RRC is to be configured and informs the configuration instructions to the RRC (406). On the basis of the configuration, the RRC makes the final capacity allocation (408) to the radio bearer in question, which allocation also ensures that there is enough capacity allocated for the reverse connection, if necessary.

The above procedure can be illustrated by means of the following example. The user of a terminal wants to download a video file from the network, and due to the application used to play the video file, the necessary data transmission rate in the downlink direction is 100 kbit/s and in the uplink direction 0 kbit/s. On the basis of the UE_capability message transmitted by the terminal, the radio resource controller RRC notices that the PDCP entities of both the terminal and the base station support a header compression algorithm according to the Internet standard proposal RFC2507, which requires a bi-directional connection. The RRC selects said compression algorithm for the radio bearer and advises it to the radio resource management system RRM. Using said compression algorithm requires a data transmission rate of 5 kbit/s, for instance, in the uplink direction. If the proportion of the header field of the entire data transmission is estimated to be 30 kbit/s, for instance, (whereby the proportion of the payload data is 70 kbit/s) and the proportion of the header field after header compression is 10 kbit/s, for instance, the data transmission rate of the downlink direction can be set at 80 kbit/s. This way, the RRM sets the radio resource controller RRC to be configured in such a manner that 80 kbit/s is allocated for the downlink and 5 kbit/s is allocated for the uplink, whereby the operation of the desired compression method is ensured and the 20 kbit/s saved in the downlink direction with respect to the application-based capacity allocation can be allocated to another user.

In the above, the invention has been described in connection with wireless packet-switched data transmission, especially with the radio resources of the UMTS system. The invention is, however, not limited to wireless data transmission only, but can also be utilized in packet-switched data transmission by wire, employing application-based data transmission capacity allocation. On connections based on the Internet protocol (IP), such as TCP (Transmission Control Protocol) or UDP (User Datagram Protocol) connections, the possibly used header compression methods are then indicated to the receiving party and data transmission resources are allocated to the terminal connection taking into account the capacity required by the header compression methods in the allocated data transmission resources.

It is obvious to a person skilled in the art that while technology advances, the basic idea of the invention can be implemented in many different ways. The invention and its embodiments are thus not restricted to the examples described above, but can vary within the scope of the claims.

The invention claimed is:

1. A method comprising:
    allocating data transmission resources in a packet-switched telecommunications system including a terminal and a fixed network to which an operational entity is defined for defining resources for a radio bearer, the allocating further comprising:
    defining a compression method of header fields in data packets used on the radio bearer, said compression method requiring a bi-directional connection, and, after defining the compression method,
    defining the radio bearer resources for the terminal on the basis of an application used by the terminal on said radio bearer in such a manner that said resources also comprise the capacity required by the defined compression method of header fields in data packets.

2. The method as claimed in claim 1, further comprising transmitting the compression -method of header fields in data packets, which are supported by the terminal, to the operational entity in the fixed network for defining the compression method to be used.

3. The method as claimed in claim 1, further comprising defining capacity in two directions for said radio bearer in response to the defined compression method of header fields in data packets requiring a bi-directional connection.

4. The method as claimed in claim 1, wherein the packet-switched telecommunications system is a UMTS system and the operational entity for defining resources for the radio bearer comprises a radio resource control protocol and a radio resource management system.

5. The method as claimed in claim 4, wherein the resources of said radio bearer are defined in the radio resource management system.

6. The method as claimed in claim 5, wherein the defined radio bearer resources are transmitted to the radio resource control protocol which allocates the radio resources of the radio bearer.

7. The method as claimed in claim 4, wherein the compression method of header fields in data packets, which are supported by a convergence protocol of the terminal, are transmitted to a radio network controller for defining the compression method to be used.

8. A packet-switched telecommunications system including:
    a terminal, and
    a fixed network which comprises an operational entity for defining resources for a radio bearer, in which system
    a compression method of header fields in data packets used on the radio bearer is configured to be defined, said compression method requiring a bi-directional connection, and after the compression method being defined
    the resources of the radio bearer are configured to be defined on the basis of an application used by the terminal on said radio bearer in such a manner that said resources also comprise the capacity required by the defined compression method of header fields in data packets.

9. The telecommunications system as claimed in claim 8, wherein
    the compression method of header fields in data packets, which are supported by the terminal, are configured to be transmitted to the operational entity in the fixed network for defining the compression method to be used.

10. The packet-switched telecommunications system as claimed in claim 8, wherein
    the packet-switched telecommunications system is a UMTS system and the operational entity for defining resources for the radio bearer comprises a radio resource control protocol and a radio resource management system.

11. An apparatus comprising:
    an operational entity for defining resources for a radio bearer in a packet-switched telecommunications system, the apparatus being arranged to:

define a compression method of header fields in data packets used on the radio bearer, said compression method requiring a bi-directional connection;

define resources of the radio bearer, after the compression method being defined, on a basis of an application used by a terminal on the radio bearer; and control a definition of the radio bearer resources in accordance with a capacity required by the defined compression method of header fields in data packets.

12. The apparatus as claimed in claim 11, wherein the apparatus is further arranged to:

define capacity in two directions for the radio bearer in response to the defined compression method of header fields in data packets requiring a bi-directional connection.

13. The apparatus as claimed in claim 11, wherein the apparatus comprises a radio resource control protocol and a radio resource management system as the operational entity for defining resources for the radio bearer.

14. The apparatus as claimed in claim 13, wherein the radio resource management system is arranged to define the resources of the radio bearer.

15. The apparatus as claimed in claim 14, wherein the radio resource management system is arranged to transmit the defined radio bearer resources to the radio resource control protocol, which allocates the radio resources of the radio bearer.

16. An apparatus comprising: at least one application capable of requesting radio bearer resources from a network of the packet-switched telecommunications system, the apparatus being arranged to:

transmit information on compression methods of header fields in data packets supported by the apparatus to the network; and execute data transmission of the at least one application in accordance with a configuration of radio bearer resources defined by the network, wherein a definition of the radio bearer resources is controlled in accordance with a capacity required by a selected header compression method, said header compression method requiring a bi-directional connection.

* * * * *